United States Patent
Beckett et al.

(10) Patent No.: US 10,549,213 B2
(45) Date of Patent: Feb. 4, 2020

(54) ACOUSTIC ENERGY-BASED CONTROL OF PARTICLE COUNT IN CRYSTALLIZATION

(71) Applicant: Covaris, Inc., Woburn, MA (US)

(72) Inventors: Carl Beckett, Harvard, MA (US); James A. Laugharn, Jr., Boston, MA (US); Srikanth Kakumanu, Chelmsford, MA (US)

(73) Assignee: Covaris, Inc., Woburn, MA (US)

( * ) Notice: Subject to any disclaimer, the term of this patent is extended or adjusted under 35 U.S.C. 154(b) by 170 days.

(21) Appl. No.: 15/902,022

(22) Filed: Feb. 22, 2018

(65) Prior Publication Data

US 2018/0236373 A1 Aug. 23, 2018

Related U.S. Application Data

(60) Provisional application No. 62/462,386, filed on Feb. 23, 2017.

(51) Int. Cl.
 *B01D 9/00* (2006.01)
(52) U.S. Cl.
 CPC .... *B01D 9/0081* (2013.01); *B01D 2009/0086* (2013.01)
(58) Field of Classification Search
 CPC ................ B01D 9/0081; B01D 2009/0086
 USPC ....................................................... 23/295 R
 See application file for complete search history.

(56) References Cited

FOREIGN PATENT DOCUMENTS

| GB | 2 447 761 A2 | 9/2008 |
|---|---|---|
| WO | WO 2010/079350 A2 | 7/2010 |

OTHER PUBLICATIONS

Extended European Search Report for European Application No. 18157583.8, dated Aug. 6, 2018.
Kakumanu, Control nucleation and crystal growth during continuous flow API production. Covaris Inc. https://www.researchgate.net/profile/Srikanth_Kakumanu/publication/279886566_Control_Nucleation_and_Crystal_Growth_During_Continuous_Flow_API_Production/links/559d478e08aeb45d1715bcfc/Control-Nucleation-and-Crystal-Growth-During-Continuous-Flow-API-Production.pdf, 3 pages [dated Jun. 2015; last accessed Jul. 19, 2018].

*Primary Examiner* — Edward M Johnson
(74) *Attorney, Agent, or Firm* — Wolf, Greenfield & Sacks, P.C.

(57) ABSTRACT

Methods and systems for preparing crystalline particle compositions using focused acoustic processing to control a number or count of crystalline particles generated. Peak incident power of focused acoustic energy used to cause primary nucleation kinetics of a solute may be adjusted to adjust the number or count of crystalline particles.

12 Claims, 3 Drawing Sheets

ACOUSTIC ENERGY-BASED CONTROL OF PARTICLE COUNT IN CRYSTALLIZATION

RELATED APPLICATION

This application claims priority under 35 U.S.C. § 119(e) to U.S. Provisional Application Ser. No. 62/462,386, entitled "ACOUSTIC ENERGY-BASED CONTROL OF PARTICLE COUNT IN CRYSTALLIZATION" filed Feb. 23, 2017, which is herein incorporated by reference in its entirety.

BACKGROUND

1. Field of Invention

Aspects described herein relate to the use of focused acoustic energy to control nucleation kinetics of crystalline particles.

2. Related Art

Acoustic energy has been used to create nucleation sites in a solution so as to cause crystalline particles to be formed at the nucleation sites, for example as taught in U.S. Patent Application Publication 2013/0026669. U.S. Patent Application Publication 2013/0026669 also teaches that acoustic energy can be used to influence the rate at which crystalline particles grow in solution, as well as control the size of crystalline particles that are formed.

SUMMARY OF INVENTION

Aspects of the invention relate to the use of focused acoustic energy to control a count, or number, of crystalline particles that are created in a solution. The inventors have surprisingly found that by adjusting a peak incident power (PIP) of focused acoustic energy applied to a solution, the number of crystalline particles generated by primary and/or secondary nucleation in the solution per unit volume and/or per unit time can be controlled. In some embodiments, primary nucleation of crystalline particles is caused at a controlled particle count generation rate in a solution maintained at a temperature and concentration of the solute that is below primary and secondary nucleation levels. That is, the solution may be maintained at a temperature and concentration level that is below that needed for primary and/or secondary nucleation to occur absent the use of focused acoustic energy. Thus, primary nucleation occurs because of the exposure to focused acoustic energy, and the particle count, i.e., the number of crystalline particles generated by primary nucleation, is controlled based on the peak incident power applied to the solution.

In one aspect of the invention, a method of preparing crystalline particles includes providing a solute in a solution at a concentration and at a temperature below that required for primary nucleation and/or secondary nucleation of the solute to occur. The solute may be dissolved in the solution, but the concentration and temperature of the solution may be such that crystallization does not occur spontaneously. In some embodiments, the solution may be maintained at a concentration and temperature that are above the solubility threshold and near (or below) the secondary nucleation threshold for the solution. In other embodiments, the solution may be maintained at a concentration and temperature that are above the secondary nucleation threshold for the solution, but below the primary nucleation threshold for the solution. While at such temperature and concentration levels, the solution may be exposed to focused acoustic energy arranged to cause the solute to form crystalline particles in the solution by primary and/or secondary nucleation. That is, crystalline particles that otherwise would not form, may be formed by exposure to the focused acoustic energy. The focused acoustic energy may result in a particle count, or number of crystalline particles that are formed, such as a number of particles per unit volume or per unit time. A total number, or count, of crystalline particles that are formed by primary and/or secondary nucleation per unit volume (or per unit time) may be adjusted by adjusting a peak incident power (PIP) of the focused acoustic energy. For example, if a PIP of 200 Watts causes 1000 particles to be generated per milliliter of solution per second, increasing the PIP to 300 Watts may increase the particle count to 1200 particles per milliliter per second. Such adjustment in PIP may repeatably and reliably adjust particle count values such that particle count can be monitored and used as feedback to the focused acoustic system to adjust PIP and thus the particle count of a crystallization process.

In some embodiments, the temperature and/or the concentration at which the solution is maintained during the steps of exposing to focused acoustic energy and adjusting the PIP may be constant. As noted above, the concentration and the temperature of the solution during exposure to focused acoustic energy may be below that required for primary nucleation, e.g., between primary and secondary threshold levels. Generally, increasing the PIP will increase the total number of crystalline particles that are formed per unit volume (and/or time), and decreasing the PIP will decrease the total number of crystalline particles that are formed per unit volume (and/or time).

In some embodiments, the solution may flow into an inlet of an acoustic energy treatment chamber for treatment with acoustic energy, and subsequently may flow out of an outlet of the acoustic energy treatment chamber. Such a flow through type system may accommodate relatively large volumes of solution, even though, for example, a volume of the treatment chamber may be relatively small. For example, 10's or 100's of liters of solution may be treated using a treatment chamber with a volume of 10 ml to 100 ml. Of course, other treatment chamber volumes may be employed.

Thus, in some embodiments, the inlet of an acoustic energy treatment chamber may be in direct fluid communication with a supply reservoir and the outlet of the acoustic energy treatment chamber may be in direct fluid communication with an outlet reservoir. For example, in one embodiment a solution may flow from a feed reactor vessel to the inlet of an acoustic energy treatment chamber, and after acoustic energy exposure, flow from the outlet of the acoustic energy treatment chamber to a mixed-suspension, mixed-product-removal (MSMPR) vessel. Such an arrangement may allow for the creation of crystalline particles that may be removed at the MSMPR vessel. In some cases, a size and/or number of crystalline particles in at least a portion the solution in the MSMPR vessel may be measured (e.g., while exiting the treatment chamber, entering the MSMPR vessel or while in the MSMPR vessel), and the measured size and/or number of crystalline particles may be used to adjust the PIP of the focused acoustic energy.

While a size of crystalline particles formed may vary, in some embodiments, the crystalline particles may each have a size below 1000 microns. For example, a process may target the formation of particles having a size below 5 microns, or a size between 5 and 100 microns, although other size ranges may be employed. In some embodiments, the crystalline particles formed by exposure to focused acoustic energy may be used to induce secondary nucleation in the solution. Accordingly, concentration and temperature of the solution may be controlled to achieve desired crystallization kinetics.

In accordance with aspects of the invention, high semi-continuous-flow of sample volumes may be processed through focused acoustics to form crystalline particles through crystal growth, such as samples greater than 50 mL, greater than 100 mL, greater than 1 L, or even greater. In some embodiments, a flow through system may be used to acoustically treat a sample having a continuous flow rate, to accumulate a high volume. For example, the sample may flow through a treatment chamber such that the sample is exposed to a focal zone of the focused acoustic field. Various portions of sample may be acoustically treated a single time or multiple times. For example, the sample may flow cyclically between the treatment chamber and a reservoir. Or, the sample may flow through a system having multiple treatment chambers and be acoustically processed in each of the treatment chambers. In some embodiments, the treatment chamber may be an elongated conduit and the focal zone of the focused acoustic field may also be elongated so as to acoustically treat the sample as the sample flows through the treatment chamber. The flow rate of at least a portion of the sample through the vessel (e.g., through the treatment chamber) may be at least 0.1 mL/min, or between about 0.5 mL/min and about 500 mL/min. Using a flow through arrangement, there is no limit as to the volume of sample material that may be acoustically processed. However, in some embodiments, preparation of crystalline particles does not require a flow through system. For example, a solution may be processed using focused acoustics to form crystalline particles in a closed treatment chamber, such as a test tube, pipette or multi-well plate.

Further features and advantages of the present invention, as well as the structure of various embodiments of the present invention are described in detail below with reference to the accompanying drawings.

BRIEF DESCRIPTION OF THE DRAWINGS

Non-limiting embodiments are described by way of example with reference to the accompanying figures, in which each identical or nearly identical component illustrated is typically represented by a reference character. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
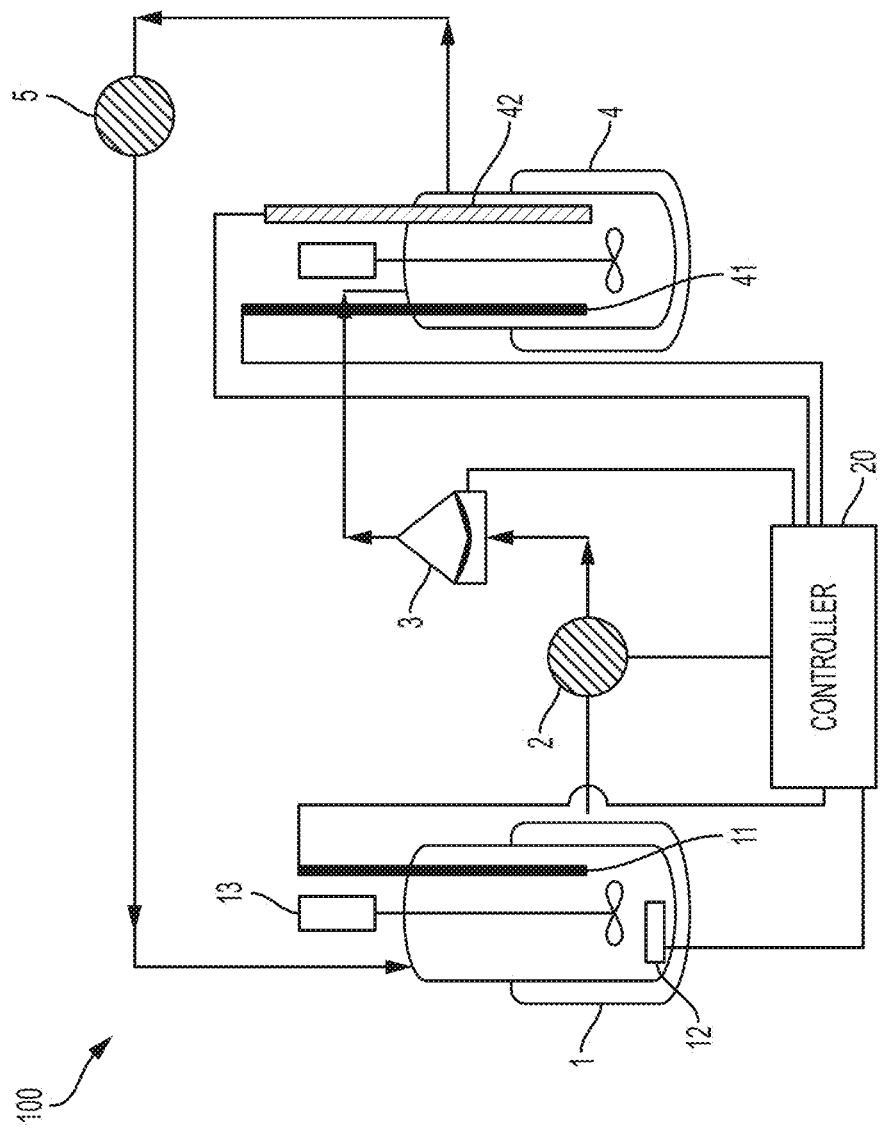
FIG. 1 shows a schematic diagram of a crystalline particle generating system in accordance with an illustrative embodiment.

The present disclosure relates to systems and methods of using focused acoustics for preparing large volumes of crystalline compositions. Processes described herein may be repeatable, controllable, yield results quickly, avoid cross-contamination of sample material and/or can be in an isothermal steady state (i.e., avoids over-heating of the sample upon acoustic treatment). For example, large volumes of sample such as having a volume of greater than about 30 mL (e.g., greater than the volume of a sample typically found in a test tube or multiwell plate) may be treated with focused acoustics so as to result in crystalline particle generation in the sample. In some embodiments, at least a portion of the sample may be flowed through a treatment chamber during focused acoustic processing. Smaller sample volumes such as volumes less than about 30 mL or volumes of sample that may be held in a test tube or multiwell plate may also be suitably processed using focused acoustics to result in a crystalline composition.

"Sonic energy" as used herein is intended to encompass such terms as acoustic energy, acoustic waves, acoustic pulses, ultrasonic energy, ultrasonic waves, ultrasound, shock waves, sound energy, sound waves, sonic pulses, pulses, waves, or any other grammatical form of these terms, as well as any other type of energy that has similar characteristics to sonic energy. "Focal zone" or "focal point" as used herein means an area where sonic energy converges and/or impinges on a target, although that area of convergence is not necessarily a single focused point, but may include a volume of varying size and shape. As used herein, the terms "treatment chamber" or "processing zone" as used herein means a vessel or region where the sonic energy converges, and the sample material is present for treatment.

Focused acoustic energy may be applied to a sample to induce crystallization kinetics according to any suitable protocol. In some instances, focused acoustic energy is provided in a pulsed manner which may create a cyclical effect involving compressive and expansive forces. As such, in some cases, pulsed focused acoustics may create an environment where crystal sites are nucleated by generating solute gradient within the solution and subsequent crystals are given the space and energy to predictably grow. In some embodiments, the sample is exposed to the focused acoustic energy continuously or at intermittent time periods. For example, the sample may be processed by a focused acoustic field for a first period of time (e.g., less than 1 minute) and then the sample may be allowed to remain for a period of time (e.g., less than 1 minute) without being subject to the focused acoustic field. The sample may subsequently be processed again in a repeated fashion in a manner that gives rise to a stable crystalline composition having a desired particle size distribution and morphology. Accordingly, depending on the protocol of focused acoustic treatment, the particle size distribution of crystalline particles may be suitably controlled. Prior to focused acoustic processing, samples may exhibit any suitable formulation. In some embodiments, before exposure to a focused acoustic field, a sample may be in the form of a solution not including any particles within the solution.

FIG. 1 illustrates a crystalline particle generating system 100 that includes focused acoustic treatment components that may be arranged like that described in more detail below. The system 100 in this embodiment includes a first reservoir 1 that may be a feed reactor arranged to provide a solution including a solute to be crystallized to a pump 2 that delivers the solution to an acoustic energy treatment chamber 3. In the treatment chamber 3, the solution is exposed to focused acoustic energy that causes the solute to crystallize to form particles that flow to a second reservoir 4, which may be a mixed-suspension, mixed-product-removal (MSMPR) vessel. Material from the second reservoir 4 may flow back to the first reservoir 1, e.g., solution free of crystalline particles may flow back to the first reservoir 1, e.g., under the motive force of a pump 5. Or, this material may transfer to downstream processes without recirculating back to the feed reservoir. By recirculating back to the feed reservoir, material in the reservoirs 1, 4 may be circulated through the chamber 3 at any suitable flow rate, pressure, time or other parameter so that the material is suitably processed by acoustic energy in the chamber 3. Flow of the material may be caused by gravity, by acoustic streaming (e.g., in the chamber 3), by the pumps 2, 5 (such as a syringe pump, a peristaltic pump, a gear pump, and so on), or other motive force. In some embodiments, a pressure may be maintained in the chamber 3 (and/or in the reservoirs 1, 4) by applying a pressurized gas, a pump or other component to generate the desired pressure in the desired locations. It should be understood, however, that aspects of the invention are not limited to use with a system like that in FIG. 1. Instead, any suitable arrangement, such as that including a single reservoir and treatment chamber 3, multiple treatment chambers 3, a treatment chamber 3 that is closed and does not support flow through of solution, etc., may be employed.

Operation of the system 100 may be controlled by a control circuit 20 which may include any suitable components to perform desired control, communication and/or other functions for the system 100. For example, the controller 20 may include one or more general purpose computers, a network of computers, one or more microprocessors, etc., for performing data processing functions, one or more memories for storing data and/or operating instructions (e.g., including volatile and/or non-volatile memories such as optical disks and disk drives, semiconductor memory, magnetic tape or disk memories, and so on), communication buses or other communication devices for wired or wireless communication (e.g., including various wires, switches, connectors, Ethernet communication devices, WLAN communication devices, and so on), software or other computer-executable instructions (e.g., including instructions for carrying out functions related to controlling the acoustic energy treatment chamber 3, etc.), a power supply or other power source (such as a plug for mating with an electrical outlet, batteries, transformers, etc.), relays and/or other switching devices, mechanical linkages, one or more sensors or data input devices (such as a sensor 41 to detect a number and/or size of crystalline particles in the second reservoir 4, a temperature sensor 11 to detect a temperature of solution in the first reservoir 1, a temperature sensor 42 to detect a temperature of solution in the second reservoir 4 and/or other portions of the system 100, a video camera or other imaging device to capture and analyze image information regarding the chamber 3 or other components, and so on), user data input devices (such as buttons, dials, knobs, a keyboard, a touch screen or other), information display devices (such as an LCD display, indicator lights, a printer, etc.), and/or other components for providing desired input/output and control functions.

In this illustrative embodiment, the first reservoir 1 includes a solution including paracetamol as a solute and ethanol as the solvent, though other solute/solvent combinations may be used with aspects of the invention. Thus, the example below regarding the use of paracetamol should be understood as providing only one, non-limiting example. The first reservoir 1 functions as a feed reactor arranged to heat the solution (e.g., to a temperature of 65 degrees C. using a heater 12 controlled by the controller 20) and to agitate or otherwise mix the solution (e.g., using an agitator 13 which may be controlled by the controller 20). The solution is maintained at a temperature and concentration below a level at which primary nucleation of paracetamol spontaneously forms crystalline particles, e.g., at a concentration of 200 grams paracetamol/kilogram ethanol (g/kg) and a temperature of 65 degrees C. The pump 2 delivers the solution to the treatment chamber 3 (e.g., at a rate of 50 ml/min or 0.83 ml/sec) where the solution is treated with acoustic energy at a temperature of 35 degrees C. and a concentration of 200 g/kg. At this temperature and concentration, the paracetamol remains in solution absent treatment with focused acoustic energy. However, exposure to focused acoustic energy in the treatment chamber 3 causes crystalline particles to be formed, and the crystalline particles exit the treatment chamber 3 and flow to the second reservoir 4. In this embodiment, the second reservoir 4 functions as a MSMPR vessel, and the crystalline particle-containing solution is maintained at 35 degrees C. in the second reservoir 4. A suitable sensor 41, such as a particle vision measurement (PVM) sensor and/or focused beam reflectance measurement (FBRM) sensor made by Mettler Toledo (Columbus, Ohio), may be used to image crystalline particles (e.g., to assess physical properties) or monitor particle counts and particle size. Such measurement may occur at the treatment chamber 3, downstream of the treatment chamber 3, at the reservoir 4, etc. Crystalline particles may be removed from the second reservoir 4 (e.g., for subsequent processing), and particle-free solution may be recycled back to the first reservoir 1 for heating, concentration adjustment, and subsequent acoustic treatment. Information from the sensor(s) 41 may be used by the controller 20 to adjust parameters of the focused acoustic treatment, such as peak incident power of the acoustic energy.

Figure 2:
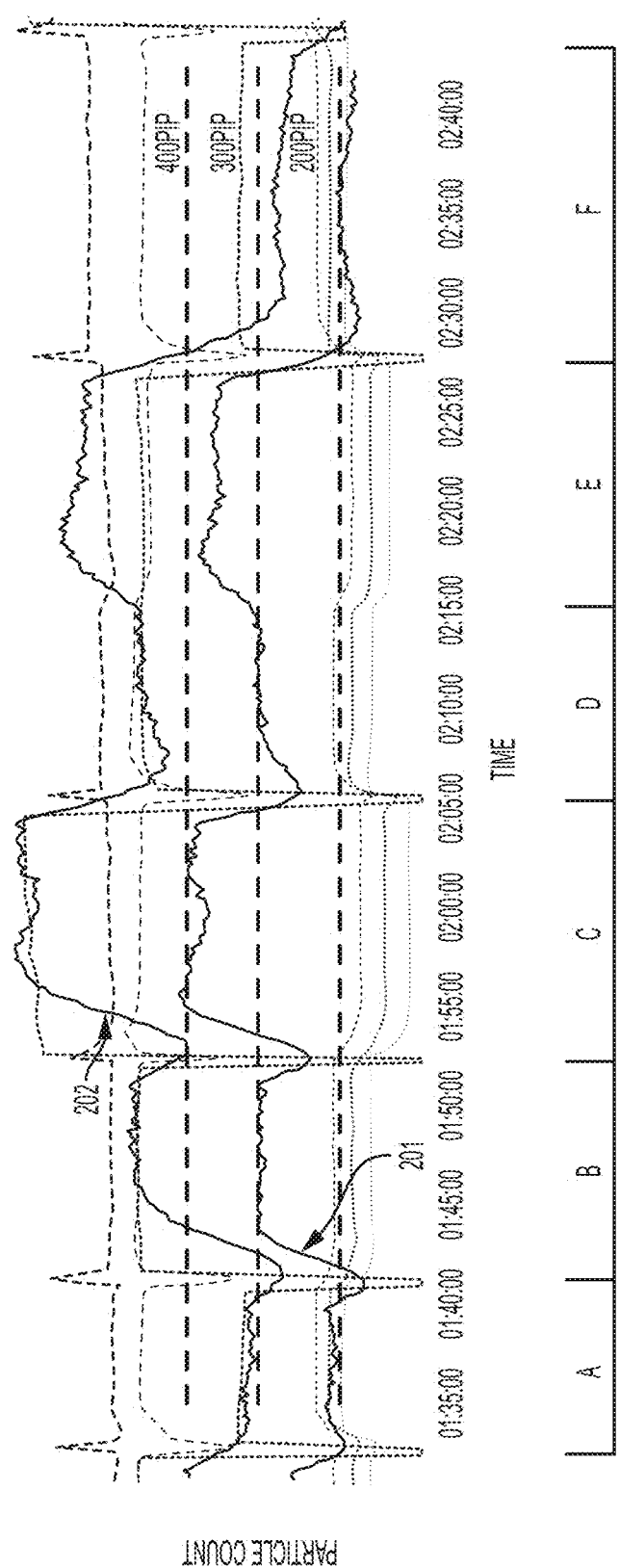
FIG. 2 shows particle count rates for different peak incident power levels in an illustrative embodiment.

For example, it may be desired to control the crystalline particle generation process such that a specific number of crystalline particles of paracetamol (or other material) are generated per unit volume and/or per unit time, such as 500 particles per second exiting the treatment chamber 3 at a particular flow rate, such as 50 ml/min (which is equivalent to about 415 particles per ml). In accordance with an aspect of the invention, the inventors have discovered that particle count rates can be accurately and repeatedly adjusted by adjusting the peak incident power (PIP) of the focused acoustic energy used to treat the solution in the treatment chamber 3. FIG. 2 shows particle count results in the illustrative embodiment above for crystalline particles generated in the acoustic treatment chamber 3 having a size below 5 microns (curve 201) and having a size between 5 and 100 microns (curve 202). In this experiment, parameters of the focused acoustic energy other than PIP were maintained constant, i.e., frequency was set at 500 kHz, a cycles per burst setting was maintained at 1,000, and duty cycle was maintained at 50%. During the time period A, the paracetamol solution was exposed to focused acoustic energy in the treatment chamber 3 at a PIP of 200 Watts. Curve 201 illustrates that crystalline particles having a size under 5 microns were generated at a rate of about 1200 particles per second (and given a flow rate of 50 ml/min, these particles were generated at a rate of about 1000 particles per ml), and curve 202 illustrates that crystalline particles having a size of 5 to 100 microns were generated at a rate of about 1700 particles per second (1416 particles per ml). During time period B, the PIP was adjusted to 300 W, and particle count rates increased to about 1700 particles per second (1416 particles per ml) for curve 201 and 2500 particles per second (2083 particles per ml) for curve 202. During time period C, the PIP was adjusted to 400 W, and particle count rates increased to about 2300 particles per second (1916 particles per ml) for curve 201 and 3500 particles per second (2916 particles per ml) for curve 202.

During time period D, the PIP was adjusted to 300 W, and particle count rates returned to about 1700 particles per second (1416 particles per ml) for curve 201 and 2500 particles per second (2083 particles per ml) for curve 202. During time period E, a temperature adjustment of the solution in the treatment chamber was made while PIP remained at 300 W, and in time period F, the PIP was adjusted to 200 W and count rates dropped to about 1200 particles per second (1000 particles per ml) for curve 201 and 1500 particles per second (1250 particles per ml) for curve 202. Accordingly, particle count rates can be accurately and reproducibly adjusted, to a very precise particle count, based on PIP of focused acoustic energy used to treat a solution. This approach to controlling particle count provides a significant advantage over systems that control particle count using temperature in a reactor. That is, PIP adjustment for focused acoustic energy can be adjusted rapidly (e.g., in less than 1 second) and the impact of PIP adjustment is relatively immediate, whereas temperature control techniques can take significantly longer (e.g., minutes) to achieve and impact the crystalline particle generation rate. Additionally, this arrangement allows a straightforward and simple feedback interface to control downstream particle characteristics, by controlling particle count. Finally, the controllable, isothermal nature of focused acoustic energy allows a very precise control of number of nucleated particles.

Figure 3:
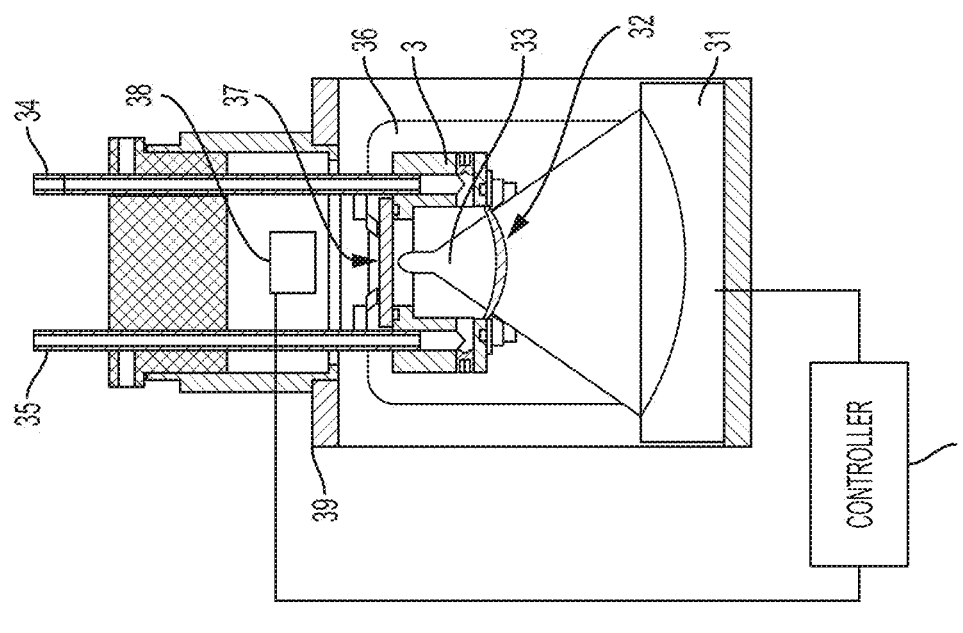
FIG. 3 shows a schematic diagram of an acoustic treatment system that may be employed in the embodiment of FIG. 1.

FIG. 3 shows a schematic block diagram of an acoustic treatment system 30 that can be employed in the embodiment of FIG. 1 or other crystalline particle generation systems. In this illustrative embodiment, the acoustic treatment system 30 includes a treatment chamber 3, where focused acoustic energy generated by an acoustic energy source 31 passes through an acoustic window 32 of the chamber 3 and into an internal volume 33 of the chamber 3 where the solution or other sample material is located. The controller 20 may control operation of the acoustic energy source 31 and/or other system components as noted above. Solution is provided into the internal volume 33 via an inlet 34 and is removed (along with crystalline particles generated) from the volume 33 via an outlet 35. The inlet and outlet may be arranged in a variety of ways, and in this embodiment the inlet 34 and outlet 35 each include a conduit coupled to the chamber 3. In some embodiments, the inlet and/or outlet may include a check valve, one-way valve, electronically-controlled valves or other arrangement that helps to ensure that flow occurs in a desired way, e.g., so the flow of material is always from the inlet to the outlet even though flow may be intermittent. The internal volume 33 may be sized and shaped as appropriate for the material to be treated, e.g., some acoustic treatment applications may function more effectively if a relatively small volume of material is treated in a relatively small volume, whereas other applications may produce better results using a larger volume for the internal volume 33. The internal volume 33 can have different shapes or other configuration characteristics, e.g., the internal volume 33 may be defined by vertical walls, can have a conical shape, can have a curved shape, and so on. Also, the chamber 3 can be made of multiple components such as an upper member, lower acoustically transparent member, and a body which together define the internal volume that contains the material to be treated. Alternately, the chamber 3 may be made as a single unitary piece or in other ways.

One or more walls of the chamber 3 may serve as, or otherwise be associated with, a thermal transfer mechanism, or heat exchanger, to dissipate any heat generated in the internal volume 33 and/or to receive heat from outside of the chamber 3 that is transferred into the internal volume 33, e.g., to maintain solution at a desired temperature during acoustic treatment. For example, the chamber 3 may include a heat exchanger in the form of a plurality of fins or other structure, such as a Peltier device, an electric resistance heater, heat conducting rods, tubes, cooling passages, etc., phase-changing materials, and so on. In one embodiment shown in FIG. 3, the chamber 3 may be completely or partially submerged in a liquid 36 that serves to transmit heat with respect to the heat exchanger. Close thermal coupling between water or other outside thermal coupling medium and the internal volume 33 may help control of the temperature of the material in the internal volume 33 during acoustic processing. For example, solution exiting the first reservoir 1 may be at a temperature of 65 degrees C., but cooled to 35 degrees C. in the treatment chamber 3 for crystalline particle generation. In this illustrative embodiment, the liquid 36 may also function as an acoustic coupling medium that transmits acoustic energy from the source 31 to the chamber 3, and control of the temperature of the coupling medium 36 can help control temperature in the internal volume 33. For example, the coupling medium 36 can be circulated through a chiller, a heater, or other means to adjust the temperature of the coupling medium 36. Thus, the solution inside the chamber 3 can be thermally linked to the coupling medium 36 temperature by careful consideration of the design of the chamber 3. The sample mixing that occurs due to the focused acoustic energy also aids in thermal management by creating a high convection coefficient between the inside sample to wall.

In certain embodiments, the acoustic energy source 31 may include an ultrasound transducer that projects a focused ultrasound beam or wave front toward the window 32 of the chamber 3. The window 32, which may sealingly close an opening in the chamber 3, may be suitably transparent to, or otherwise transmit acoustic energy so that the ultrasound beam penetrates the window 32 to form a focal zone within the internal volume 33 that acts upon the material in the chamber 3. In certain embodiments, the window 32 is a thin metal such as stainless steel, Hasteloy, or glass, sapphire, quartz or a polymer such as a thin film polymer. The window 32 may have any suitable shape or other configuration, e.g., may be flat (or otherwise present a relatively flat surface to the impinging acoustic energy), or may be curved so as have a hemispherical or other convex shape. In certain embodiments, the window 32 is shaped to guide the sonic energy in a preferred manner relative to the internal volume 33, such as focusing or defocusing the acoustic energy, through a 'lease' effect caused by the physical shape of the window 32 (such as an effect caused by a concave or convex shape). In some embodiments, the window 32 has an acoustic impedance similar to that of water and a relatively low acoustic absorption. One preferred material is stainless steel, but materials such as low density polyethylene, polypropylene, polystyrene, poly(ethylene teraphthalate) ("PET"), polyimide, and other rigid and flexible polymers may also be used.

The upper portion of the chamber 3 may include an inspection window 37, which can be flat or domed or otherwise arranged to enclose the internal volume 33 while permitting visible light or other inspection of the internal volume 33. Such inspection may be done by a human, or by a suitably arranged sensor 38 such as a video camera, photodetector, laser spectroscopy, IR detector, and so on. Characteristics of the material in the internal volume 33 detected by the sensor 38, such as particle count and/or size, may be used by the controller 20 to control the acoustic energy source 31 or other components of the system.

As can be seen in FIG. 3, a vessel 39 may contain the acoustic energy source 31, the chamber 3 as well as the coupling medium 36. The vessel 39 may take any suitable size, shape or other configuration, and may be made of any suitable material or combination of materials (such as metal, plastic, composites, etc.). In this illustrative embodiment, the vessel 39 has a jar- or can-like configuration with an opening arranged to permit access to an internal volume of the vessel 39. The acoustic energy source 31 and the coupling medium 36 (such as water or other liquid, or optionally a solid material) may be positioned in the vessel 39, e.g., with the acoustic energy source 31 near a bottom of the vessel 39. (If the coupling material 36 is solid, the vessel 39 and the coupling medium 36 may be essentially integrated with each other, with the coupling medium 36 essentially functioning as an acoustic coupling as well as a physical attachment of the acoustic source 31 and the chamber 3.) The chamber 3 can be lowered into the vessel 39, e.g., so that the chamber 3 is partially or completely submerged in the coupling medium 36. The coupling medium 36 may function as both an acoustic coupling medium, e.g., to transmit acoustic energy from the acoustic energy source 31 to the window 32, as well as a thermal coupling medium, e.g., to accept heat energy from the chamber 3. In other embodiments, the thermal and acoustic coupling medium may be separate, e.g., where the chamber 3 is provided with a cooling jacket.

Under the control of a control circuit 20, the acoustic transducer 31 may produce acoustic energy within a frequency range of between about 100 kilohertz and about 100 megahertz such that the focal zone at the internal volume 33 has a width of about 2 centimeters or less. The focal zone of the acoustic energy may be any suitable shape, such as spherical, ellipsoidal, rod-shaped, or column-shaped, for example, and be positioned at the material in the internal volume 33. The focal zone may be larger than the sample volume, or may be smaller than the sample volume. U.S. Pat. Nos. 6,948,843 and 6,719,449 are incorporated by reference herein for details regarding the construction and operation of an acoustic transducer and its control. The focal zone may be stationary relative to the sample, or it may move relative to the sample.

In some embodiments, the transducer can be formed of a piezoelectric material, such as a piezoelectric ceramic. The ceramic may be fabricated as a "dome", which tends to focus the energy. One application of such materials is in sound reproduction; however, as used herein, the frequency is generally much higher and the piezoelectric material would be typically overdriven, that is driven by a voltage beyond the linear region of mechanical response to voltage change, to sharpen the pulses. Typically, these domes have a longer focal length than that found in lithotriptic systems, for example, about 20 cm versus about 10 cm focal length. Ceramic domes can be damped to prevent ringing or undamped to increase power output. The response may be linear if not overdriven. The high-energy focus zone of one of these domes is typically cigar-shaped. At 1 MHz, the focal zone is about 6 mm long and about 2 mm wide for a 10 cm dome, or at 0.5 MHz about 15 mm long and about 3 mm wide for a 10 cm dome. The peak positive pressure obtained from such systems at the focal zone is about 1 MPa (mega Pascal) to about 10 MPa pressure, or about 150 PSI (pounds per square inch) to about 1500 PSI, depending on the driving voltage. The focal zone, defined as having an acoustic intensity within about 6 dB of the peak acoustic intensity, is formed around the geometric focal point.

To control an acoustic transducer 31, the system control circuit 20 may provide control signals to a load current control circuit, which controls a load current in a winding of a transformer. Based on the load current, the transformer may output a drive signal to a matching network, which is coupled to the acoustic transducer 31 and provides suitable signals for the transducer 31 to produce desired acoustic energy.

It is to be understood that the invention is not limited in its application to the details of construction and the arrangement of components set forth in the following description or illustrated in the drawings. Other embodiments and manners of carrying out the invention are possible. The phraseology and terminology used herein is for the purpose of description and should not be regarded as limiting. The use of "including," "comprising," or "having" and variations thereof is meant to encompass the items listed thereafter and equivalents thereof as well as additional items. Having thus described various illustrative embodiments and aspects thereof, modifications and alterations may be apparent to those of skill in the art. Such modifications and alterations are intended to be included in this disclosure, which is for the purpose of illustration only, and is not intended to be limiting. The scope of the invention should be determined from proper construction of the appended claims, and their equivalents.

The invention claimed is:

1. A method of preparing crystalline particles, comprising:
providing a solute in a solution at a concentration and at a temperature below that required for primary nucleation of the solute to form crystalline particles to occur;
exposing the solution to focused acoustic energy arranged to cause the solute to form crystalline particles in the solution by primary or secondary nucleation; and
adjusting a total number of crystalline particles that are formed by primary nucleation per unit volume by adjusting a peak incident power (PIP) of the focused acoustic energy.

2. The method of claim 1, wherein the temperature at which the solution is maintained during the steps of exposing and adjusting is constant.

3. The method of claim 1, wherein the concentration and the temperature are below that required for secondary nucleation.

4. The method of claim 1, wherein the step of adjusting includes increasing the PIP to increase the total number of crystalline particles that are formed per unit volume, or decreasing the PIP to decrease the total number of crystalline particles that are formed per unit volume.

5. The method of claim 1, wherein the solution flows into an inlet of an acoustic energy treatment chamber and flows out of an outlet of the acoustic energy treatment chamber.

6. The method of claim 5, wherein the solution flows from a feed reactor vessel to the inlet of the acoustic energy treatment chamber, and flows from the outlet of the acoustic energy treatment chamber to a mixed-suspension, mixed-product-removal (MSMPR) vessel.

7. The method of claim 6, further comprising measuring a size or number of crystalline particles in at least a portion the solution in the MSMPR vessel, and using the measured size or number of crystalline particles to adjust the PIP of the focused acoustic energy.

8. The method of claim 5, wherein the solution is exposed to a focal zone of the focused acoustic energy while disposed in the acoustic energy treatment chamber.

9. The method of claim 5, wherein the inlet of the acoustic energy treatment chamber is in direct fluid communication with a supply reservoir and the outlet of the acoustic energy treatment chamber is in direct fluid communication with an outlet reservoir.

10. The method of claim 1, wherein the crystalline particles each have a size below 1000 microns.

11. The method of claim 1, further comprising using the crystalline particles to induce secondary nucleation in the solution.

12. The method of claim 1, wherein the focused acoustic energy has a frequency of between about 100 kilohertz and about 100 megahertz and a focal zone having a size dimension of less than about 2 milliliters.

* * * * *